(12) United States Patent
Chandley et al.

(10) Patent No.: US 8,185,825 B2
(45) Date of Patent: May 22, 2012

(54) HIDING SEARCH BOX BASED ON SEARCH PROVIDER SETTINGS

(75) Inventors: Adrian Mark Chandley, Sammamish, WA (US); Shannon Katherine Westphal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 12/475,240

(22) Filed: May 29, 2009

(65) Prior Publication Data
US 2010/0306237 A1    Dec. 2, 2010

(51) Int. Cl.
*G06F 3/00* (2006.01)

(52) U.S. Cl. ........ 715/738; 715/744; 715/746; 715/780; 707/706

(58) Field of Classification Search .................. 715/738, 715/744, 746, 780; 707/706, 707, 712, 769
See application file for complete search history.

(56) References Cited

U.S. PATENT DOCUMENTS

| | | | |
|---|---|---|---|
| 7,712,033 B2 * | 5/2010 | Shafron | 715/744 |
| 8,010,523 B2 * | 8/2011 | Djabarov | 707/721 |
| 8,042,060 B1 * | 10/2011 | Djabarov et al. | 715/811 |
| 2003/0086063 A1 * | 5/2003 | Williams et al. | 351/221 |
| 2003/0191736 A1 * | 10/2003 | Reid et al. | 707/1 |
| 2005/0097089 A1 * | 5/2005 | Nielsen et al. | 707/3 |
| 2007/0143264 A1 | 6/2007 | Szeto | |
| 2007/0283273 A1 | 12/2007 | Woods | |
| 2008/0134084 A1 * | 6/2008 | Clark et al. | 715/808 |
| 2010/0257479 A1 * | 10/2010 | Do et al. | 715/780 |
| 2012/0036477 A1 * | 2/2012 | Djabarov et al. | 715/811 |

OTHER PUBLICATIONS

How to Remove the Search Box in Google Toolbar for Firefox http://www.gfanatic.com/remove-search-box-google-toolbar-firefox/, pp. 1-4.
Toolbar Help http://www.google.com/support/forum/p/Toolbar/thread?tid=1a3d6d50fa6bea10&hl=en 2009, 1 page.
Remove the Built-In Search Bar on IE 7 http://www.howtogeek.com/howto/windows/remove-the-built-in-search-bar-on-ie-7/ 2006-2009, pp. 1-8.
Hide Search Box http://www.myspacecore.com/hide/search-box.html, pp. 1-2.
Netvibes Now Fully Integrated with Google Search http://blog.netvibes.com/?2008/06/30/178-netvibes-now-fully-integrated-with-google-search, pp. 1-18.
Can you Remove the Yahoo Search Box from the Yahoo Toolbar? http://wiki.answers.com/Q/Can_you_remove_the_yahoo_search_box_from_the_yahoo_toolbar, 2 pages.
How to: Hide Internet Explorer's Search Box http://www.intowindows.com/how-to-hide-internet-explorers-search-box/ 2008, 2 pages.

* cited by examiner

*Primary Examiner* — Ba Huynh (74) *Attorney, Agent, or Firm* — Shook Hardy & Bacon LLP (57) ABSTRACT

The display of a search box within a toolbar is controlled based on the search provider settings of search box native to an application or operating system, such as a search box natively provider by a web browser. The search box is maintained within the toolbar when the search provider for the native search box differs from the toolbar search provider. The search box may be removed or "hidden" from the toolbar when the search provider for the native search box is the same as the toolbar search provider.

20 Claims, 11 Drawing Sheets

HIDING SEARCH BOX BASED ON SEARCH PROVIDER SETTINGS

BACKGROUND

The amount of digital information and content available on computing devices continues to grow exponentially. Given the vast amount of digital information, search engines and other search technologies have been developed to assist users in locating specific information and documents. For instance, many search engines allow users to search for documents and information available on the Internet or World Wide Web. Additionally, it is now common for individual websites and application programs to provide a search box so that users can run queries for content on that website or within that application. Similarly, desktop search techniques allow a user to search for information and documents stored on his or her computer.

Search engines typically provide an input box or "search box" that allows users to enter search queries that include one or more terms that may be of interest to the users. After receiving a search query from a user, a search engine identifies documents and/or web pages that are relevant based on the terms and displays search results to the user. Because of its utility, web searching, that is, the process of finding relevant web pages and documents for user issued search queries has arguably become the most popular service on the Internet today.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to controlling the display of a search box within a toolbar based on the search provider settings of a native search box, such as a web browser search box. In accordance with embodiments of the present invention, the search box is maintained within the toolbar when the search provider of the native search box differs from the toolbar search provider. However, when the search provider of the native search box is set the same as the toolbar search provider, the search box may be removed or "hidden" from the toolbar.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for controlling the display of a search box within a toolbar based on the search provider settings of a native search box, such as a search box provided natively by a web browser. Accordingly, in one aspect, an embodiment of the present invention is directed to one or more computer-storage media storing computer-useable instructions that, when used by a computing device, cause the computing device to perform a method. The method includes displaying a search box within a toolbar when a search provider set for a native search box differs from a search provider for the toolbar. The method also includes allowing the search box to be removed from the toolbar when the search provider set for the native search box matches the search provider for the toolbar.

In another embodiment, an aspect of the invention is directed to one or more computer-storage media storing computer-useable instructions that, when used by a computing device, cause the computing device to perform a method. The method includes receiving a command to remove a search box from a toolbar. The method also includes determining that a search provider set for a browser search box matches a search provider for the toolbar. the method further includes removing the search box from the toolbar.

A further embodiment of the present invention is directed to one or more computer-storage media storing computer-useable instructions that, when used by a computing device, cause the computing device to perform a method. The method includes displaying a toolbar without a search box when a search provider set for a browser search box matches a search provider for the toolbar. The method also includes determining that the search provider set for the browser search box is changed to differ from the search provider for the toolbar. The method further includes displaying the search box in the toolbar based on determining that the search provider set for the browser search box differs from the search provider for the toolbar.

Figure 1:
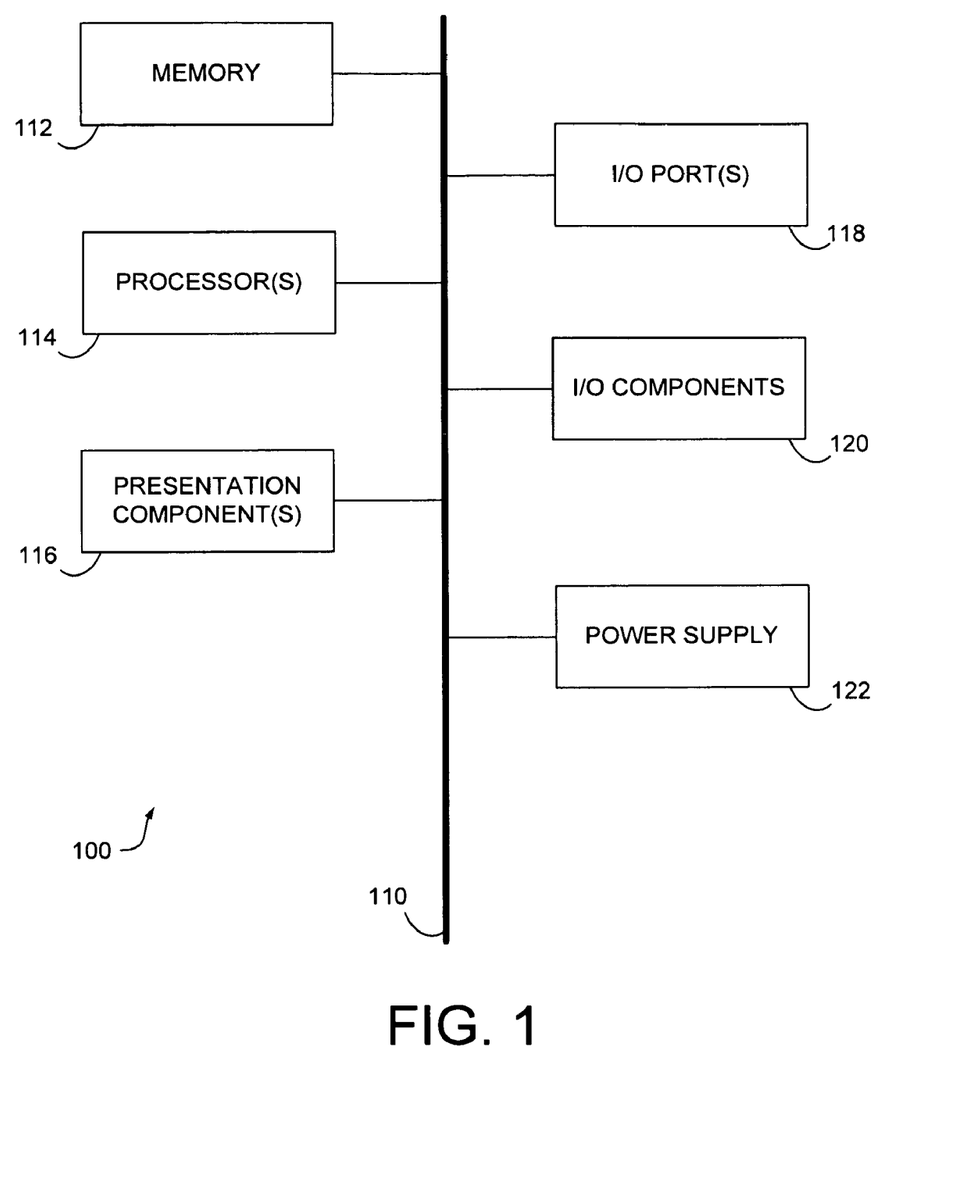
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 8:
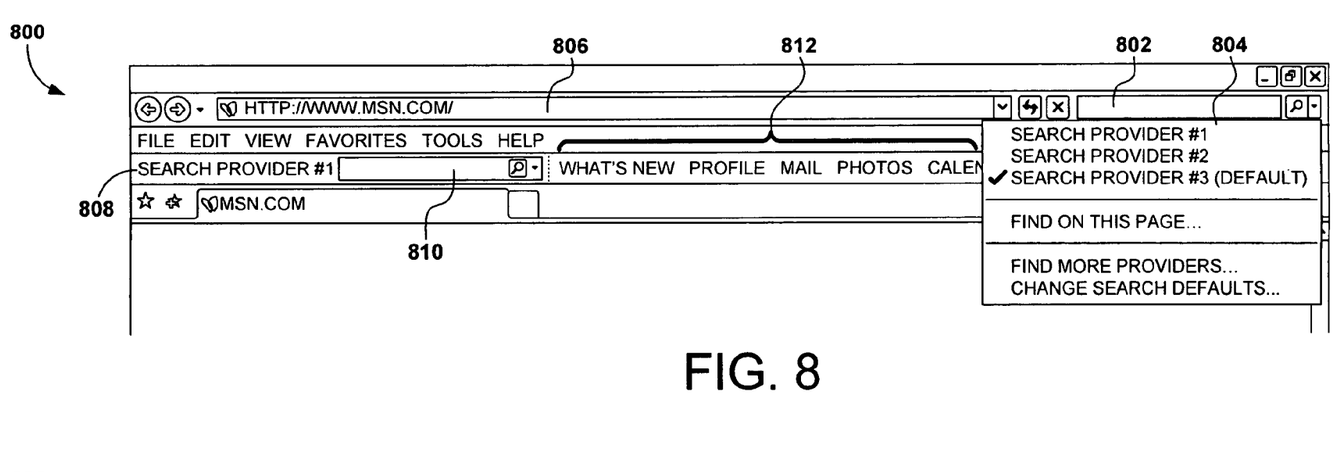
FIG. 8 is an illustrative screen display of a web browser showing a browser search box and a toolbar in which the browser search box search provider differs from the toolbar search provider in accordance with an embodiment of the present invention.

As discussed previously, search engines typically provide a search box that allows users to enter search queries that include one or more terms that may be of interest to the users. Due to the popularity of search engines, search boxes have been incorporated into various applications. For instance, web browsers, such as the INTERNET EXPLORER search engine available from Microsoft Corporation of Redmond, Wash., often incorporate a search box as a native element of the web browsers. As such, a user does not need to input the URL of a search engine web page to access a search box for the search engine. Instead, a search box is presented as a native element of the web browser. For instance, referring to FIG. 8, a screen shot of a web browser 800 is presented. As shown in FIG. 8, the web browser 800 includes a search box 802 allowing users to enter search queries. The search box 802 is capable of being associated with a number of different search providers. For instance, a drop-down menu 804 is presented in conjunction with the search box 802 that lists three search providers that may be selected by the user, including Search Provider #1, Search Provider #2, and Search Provider #3. The user may select a search provider from the menu 804 such that when a search query is entered in the search box 802, a search is performed by the selected search provider.

In some instances, the address bar 806 may operate as a search box. As is known in the art, the address bar 806 is typically employed by a user to input a URL to be retrieved by the web browser and/or to display the URL of the content currently displayed within the web browser. The address bar 806 may also operate as a search box by recognizing that text entered by the user in the address bar 806 does not match a URL and causing a search to be performed using the entered text as a search query. As such, in some embodiments, a web browser may provide the search box 802 as a native search box and/or may provide the address bar 806 as a native search box.

A number of search providers also provide toolbars. As used herein, the term "toolbar" refers to any type of application extension that is not native to an application but instead is an extension to the application to provide search capabilities and further functionality. In the context of web browsers, there are a number of toolbars that are available as browser extensions. For instance, a user may download and install a search provider's toolbar, which is then presented as part of the web browser.

A search provider's toolbar typically includes a search box, as well as additional functionality. For instance, the web browser 800 of FIG. 8 includes a toolbar 808 provided by Search Provider #1. The toolbar includes a search box 810 for entering a search query to perform a search using the search engine provided by Search Provider #1. Additionally, the toolbar provides the user with additional functionality via a number of features 812 presented in the toolbar and selectable by the user. For instance, the additional features 812 may include a mail feature that allows the user to access his or her webmail account or a calendar feature that allows the user to access a personal calendar. One skilled in the art will recognize that toolbars may provide a wide variety of functionality.

Because a web browser may include a search box and a user may install one or more toolbars as browser extensions, there is the potential for multiple search boxes in the web browser. Presenting multiple search boxes in a web browser reduces the total area for viewing web pages and/or presenting other UI elements or features within the web browser. Similarly, native search boxes may be provided in an application or operating system in other contexts, such as for desktop searching, and users may download and install extensions in these contexts resulting in multiple search boxes, which reduces available screen real estate.

As previously mentioned, embodiments of the present invention relate to controlling the display of a search box in a toolbar based on the search provider settings of a search box native to an application or operating system. While the following description will primarily discuss embodiments in the context of web browsers (i.e., a search box native to a web browser and a browser toolbar), it should be understood that embodiments of the present invention extend to other areas of search. In other words, embodiments include any context in which a search box is provided as a native feature of an application or operating system and a search box extension (i.e., a "toolbar") is also provided such that there are multiple search boxes. For instance, embodiments of the present invention may apply to desktop search for searching files and folders stored on the user's computing device.

In accordance with embodiments of the present invention, the display of a search box within a toolbar is dictated by the search provider settings of the native search box (e.g., a browser search box). In particular, a user is given the option to remove or "hide" the search box of a toolbar if the user sets the search provider of the native search box to match the search provider of the toolbar. In other words, hiding or removing a search box from a toolbar refers to displaying the toolbar without the search box. Alternatively, if the search provider of the native search box differs from the toolbar search provider, the search box is maintained within the toolbar.

Figure 2:
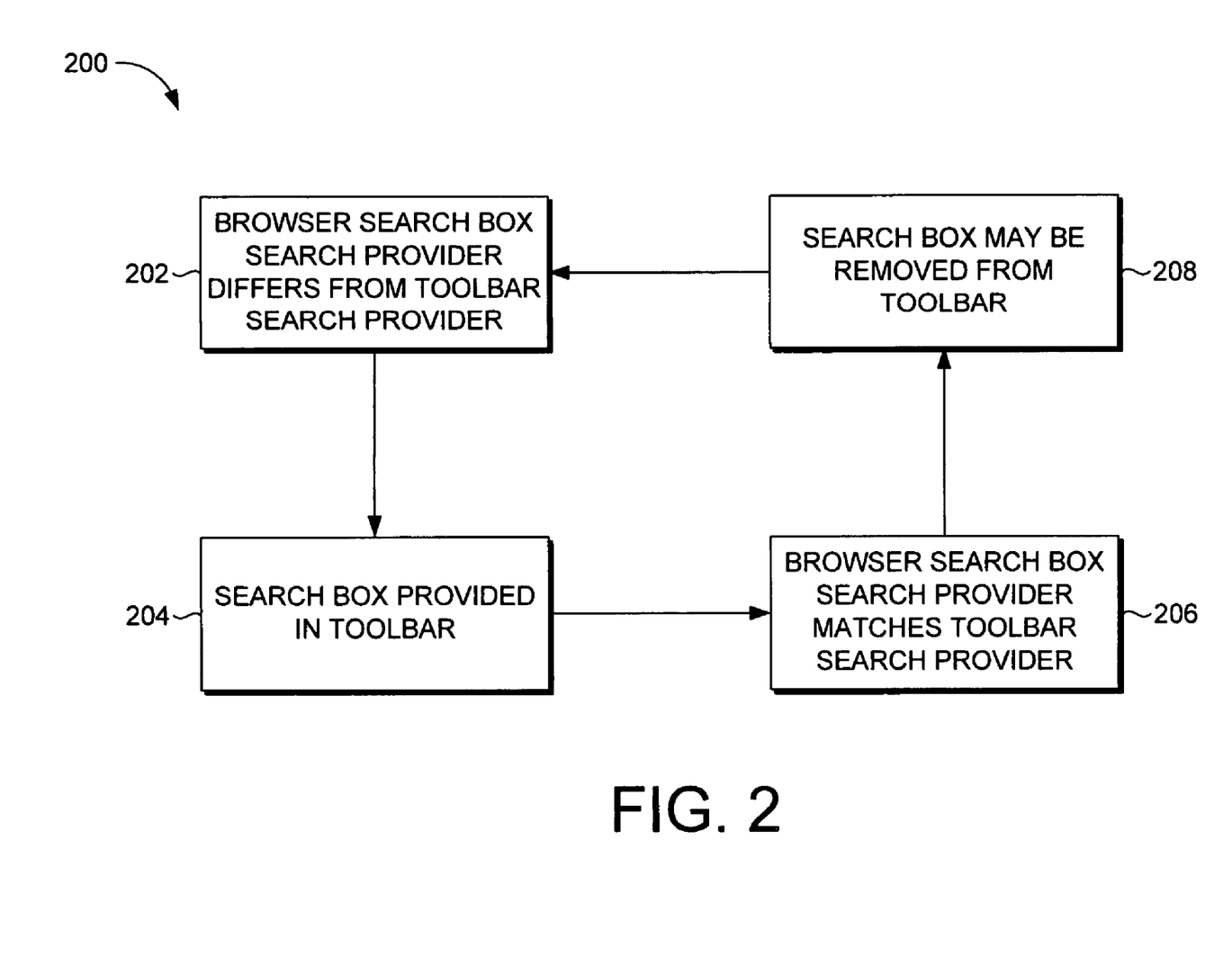
FIG. 2 is a flow diagram showing an overall process for controlling the display of a search box in a toolbar based on the search provider settings of a browser search box in accordance with an embodiment of the present invention.

With reference to FIG. 2, a flow diagram is provided that illustrates an overall process 200 for controlling the display of a toolbar search box based on the search provider settings of a browser search box in accordance with an embodiment of the present invention. As shown at block 202, the browser search box search provider differs from the toolbar search provider. Based on a different search provider being set for the browser search box, the search box is maintained within the displayed toolbar, as shown at block 204

As shown at block 206, the browser search box search provider is set such that it is the same as the search provider of the toolbar. For instance, the user may change the search provider settings of the browser search box. Based on the browser search box search provider matching the toolbar search provider, the user is given the option to remove the search box from the toolbar, as shown at block 208. As demonstrated by the return from block 208 to block 202, if the search box is removed from the toolbar and the browser search box search provider settings are changed such that the search provider of the browser search box differs from the toolbar search provider, the search box is returned to the toolbar.

The search provider settings for a browser search box (or other native search box) may be controlled in a number of different manners. For instance, in some cases, the user may set a search provider as the default search provider for the browser search box. As the default search provider, the browser search box is set to the default search provider any time the browser is launched. The user may change the search provider for the browser search box while the browser is open without changing the default settings. A search provider that is selected by a user but not set as the default remains as the search provider of the browser search box only as long as the user employs the currently open browser. If the browser is closed and later opened again, the default search provider will be returned as the search provider for the browser search box. In accordance with some embodiments of the present invention, a search box may be removed from a toolbar only if the toolbar search provider is set as the default search provider of the browser search box. In other embodiments of the present invention, a search box may be removed from a toolbar any time the native search box search provider matches the toolbar search provider, even if the default search provider differs. Any and all such variations are contemplated to be within the scope of embodiments of the present invention.

There are a number of different approaches that may be employed to control removal of a search box from a toolbar based on the search provider settings of a browser search box in various embodiments of the present invention. FIGS. 3 through 6 are provided as examples of several approaches for illustration purposes. However, it should be recognized that embodiments of the present invention are not limited to those described with reference to these figures but include other approaches for removing toolbar search boxes based on search provider settings of a browser search box.

Figure 3:
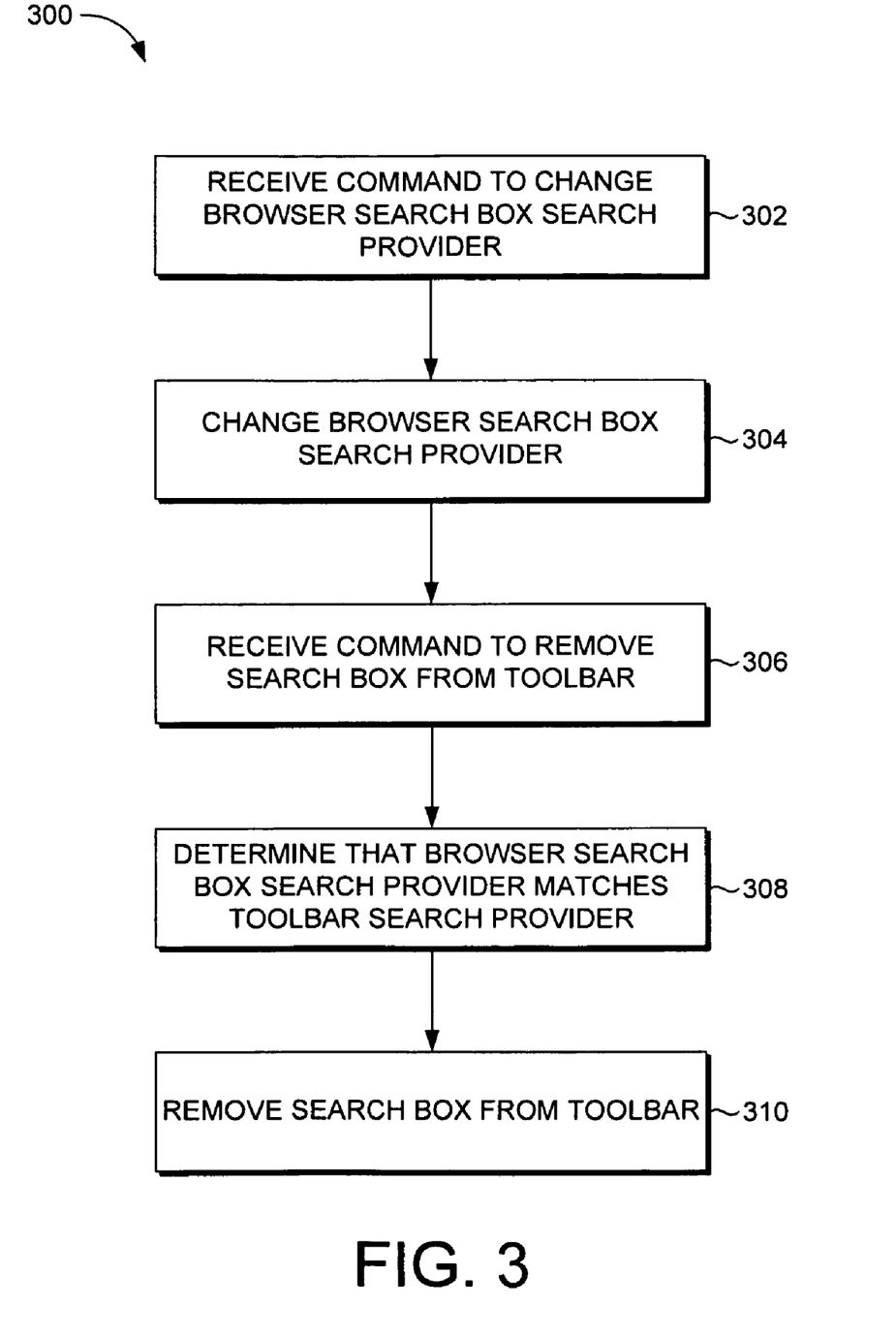
FIG. 3 is a flow diagram showing a method for removing a search box from a toolbar based on the search provider settings of a browser search box in accordance with an embodiment of the present invention.

Referring initially to FIG. 3, a flow diagram is provided that illustrates a method 300 for removing a search box from a toolbar in accordance with an embodiment of the present invention. Initially, as shown at block 302, a command is received to change the search provider of the browser search box. In the present embodiment, the search provider of the browser search box is changed to match the toolbar search provider. The user may change the browser search box search provider in a number of different ways in accordance with various embodiments of the present invention. For instance, a browser search box may include a drop down menu that allows for user selection of the search provider for the browser search box. In some embodiments, the user may change the search provider settings for the browser search box by accessing an options dialog box for the browser or toolbar that provides a number of options/settings for the browser or toolbar. Any and all such variations are contemplated to be within the scope of embodiments of the present invention.

As shown at block 304, the browser search box search provider is changed such that it matches the search provider of the toolbar. Next, a command is received to remove a search box from a toolbar, as shown at block 306. There may be a number of entry points allowing a user to control the display of a search box in a toolbar. For instance, in some embodiments, the options dialog box for the browser from which the user may have changed the browser search box search provider may provide the option to remove the search box from the toolbar. In others embodiments, the user may access a context menu by right clicking the toolbar using a pointing device, such as a mouse. This may include right clicking the toolbar in a zone or within a particular distance surrounding the search box. The context menu may include a number of search box and/or toolbar specific actions. In embodiments, the context menu includes an action to hide the search box in the toolbar. In other embodiments, the user may access an options dialog box for the toolbar that includes a number of option settings for the toolbar. The options dialog box in such embodiments includes the option to remove the search box from the toolbar. Any and all such variations are contemplated to be within the scope of embodiments of the present invention.

It is determined that the browser search box search provider matches the toolbar search provider, as shown at block 308. Accordingly, the search box is removed from the toolbar at block 310 based on this determination.

Figure 4:
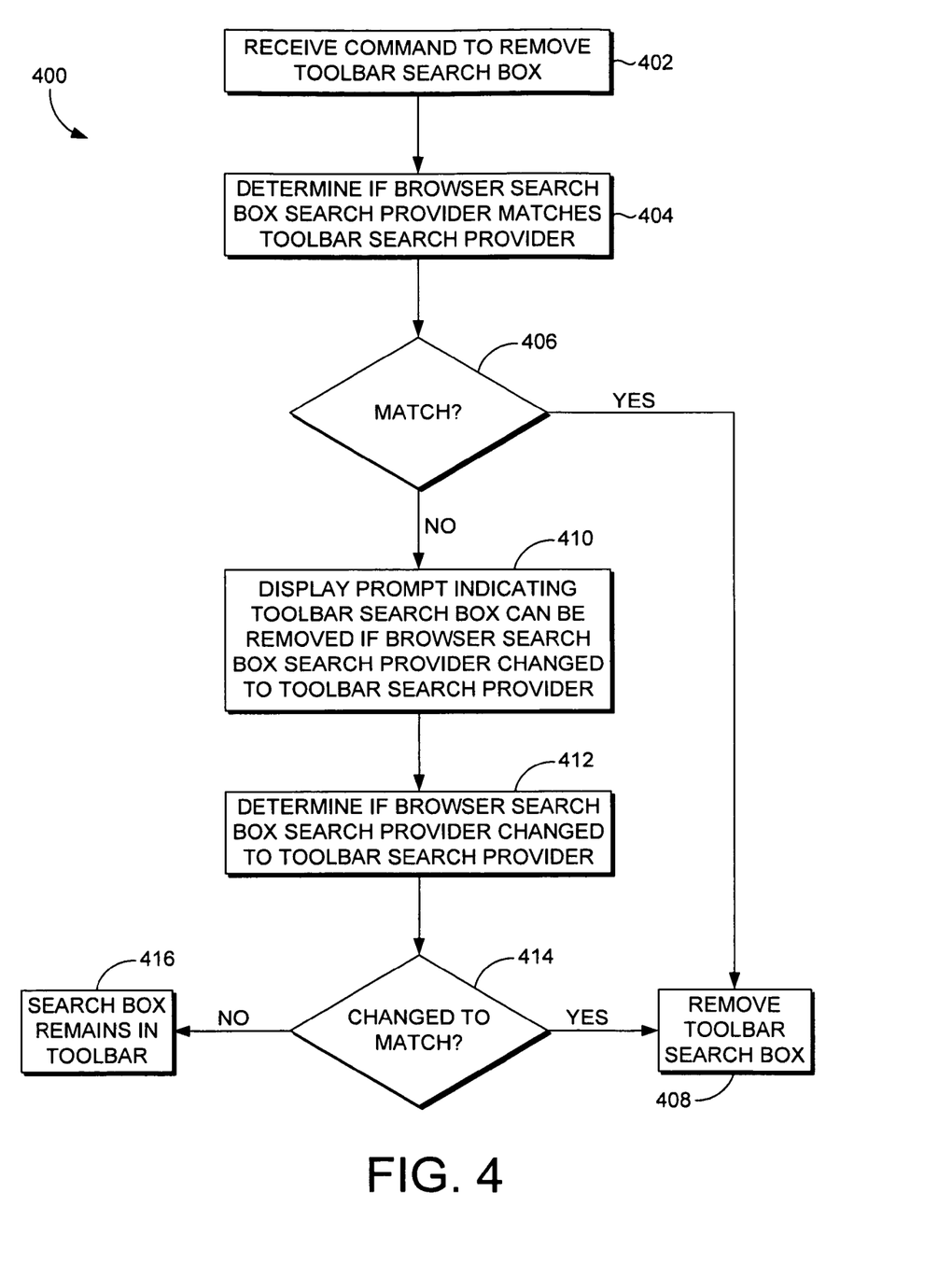
FIG. 4 is a flow diagram showing a method for removing a search box from a toolbar based on the search provider settings of a browser search box in accordance with another embodiment of the present invention.

Referring next to FIG. 4, a flow diagram is provided that illustrates a method 400 for removing a search box from a tool bar in accordance with another embodiment of the present invention. Initially, as shown at block 402, a command is received to remove a search box from a toolbar. As discussed above, there may be a number of entry points allowing a user to control the display of a search box in a toolbar. For instance, the user may access an options dialog box for the browser, a context menu for the toolbar, or an options dialog box for the toolbar to provide a command to remove the search box from the toolbar.

After the command to remove the toolbar search box is received, whether the search provider of the browser search box is currently set as matching the search provider of the toolbar is determined, as shown at block 404. If a match between the browser search box search provider and the toolbar search provider is determined at block 406, the search box is removed from the toolbar, as shown at block 408. Alternatively, if it is determined at block 406 that the browser search box search provider differs from the toolbar search provider, a prompt is displayed indicating to the user that the toolbar search box can be removed from the toolbar only if the browser search box search provider is changed to match the toolbar search provider, as shown at block 410.

In some embodiments, the prompt may provide the user with the ability to change the search provider settings of the browser search box. For instance, the prompt may allow the user to confirm changing the search provider of the browser search box to match the toolbar search provider. In such embodiments, a determination is made regarding whether the browser search box search provider is changed to match the toolbar search box, as shown at block 412. If it is determined that the user selects to change the browser search box search provider to match the toolbar search provider at block 414, the search box is removed from the toolbar, as shown at block 408. Alternatively, if the user chooses not to change the search provider of the browser search box such that a match is not determined at block 414, the search box remains displayed in the toolbar, as shown at block 416.

Figure 5:
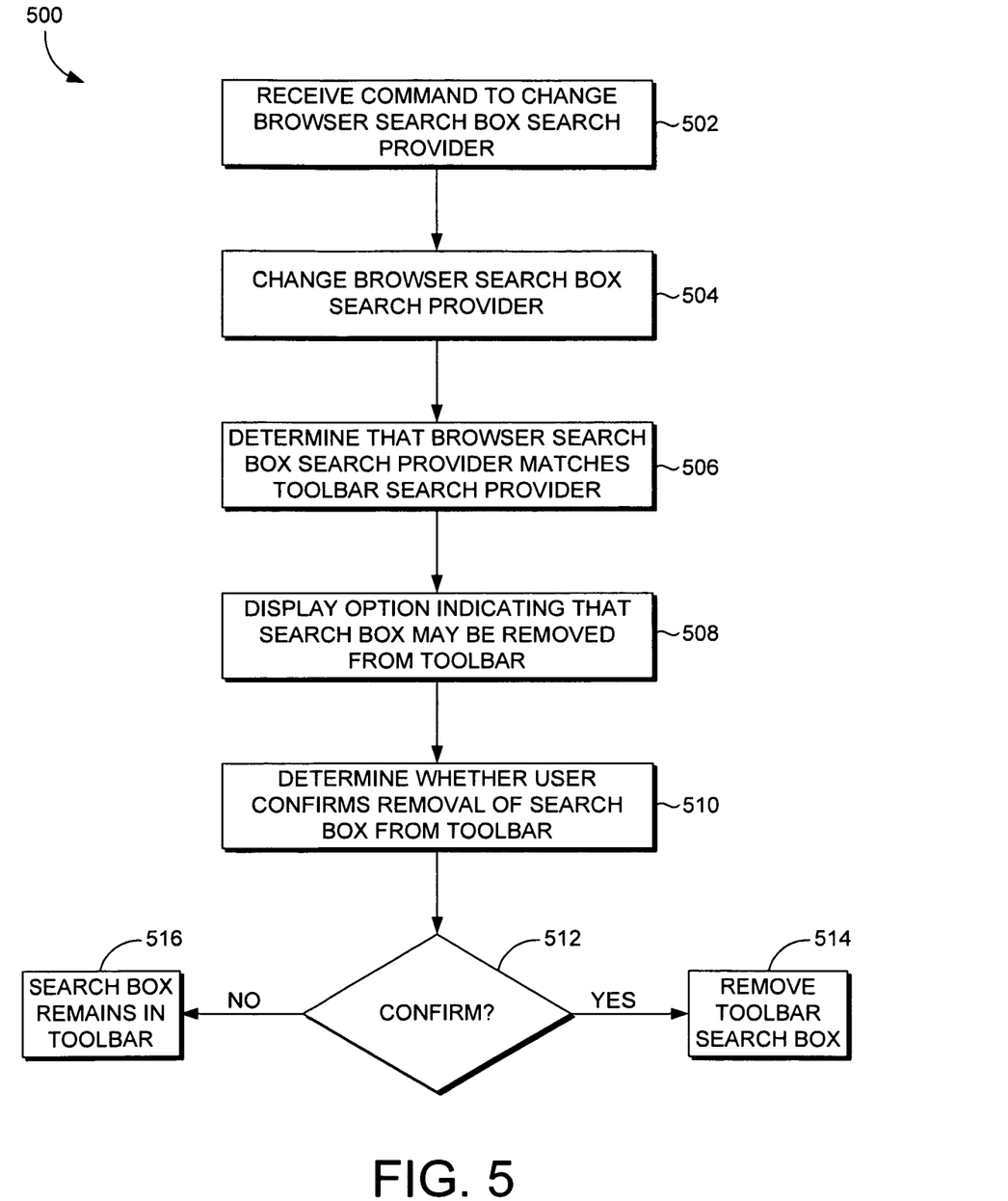
FIG. 5 is a flow diagram showing a method for removing a search box from a toolbar based on the search provider settings of a browser search box in accordance with still a further embodiment of the present invention.

Next, FIG. 5 provides a flow diagram that illustrates a method 500 for removing a search box from a toolbar in accordance with yet another embodiment of the present invention. Initially, as shown at block 502, a command is received to change the browser search box search provider. As discussed previously, there may be a number of different methods for changing the search provider settings for the browser search box. For instance, search provider settings may be accessed via a drop-down menu from the search box or from an options dialog box for the browser. In response to the command, the browser search box search provider is changed, as shown at block 504.

As shown at block 506, it is determined that the browser search box search provider matches the toolbar search provider. Based on the determination that the browser search box search provider matches the toolbar search provider, an option is displayed indicating that a search box may be removed from a toolbar, as shown at block 508. For instance, when the user changes the search provider settings of the browser search box in an options dialog box for the browser, the option to remove the search box from the toolbar may be presented in the options dialog box in conjunction with the browser search box search provider settings. As another example, a prompt may be displayed that allows a user to confirm or reject removal of the search box from the toolbar.

A determination is made at block 510 regarding whether the user confirms removal of the search box from the toolbar. If the removal of the search box from the toolbar is confirmed at block 512, the toolbar is removed from the search box, as shown at block 514. Alternatively, if it is determined that the user does not confirm removal of the search box from the toolbar at block 512, the search box remains displayed in the toolbar, as shown at block 516.

Figure 6:
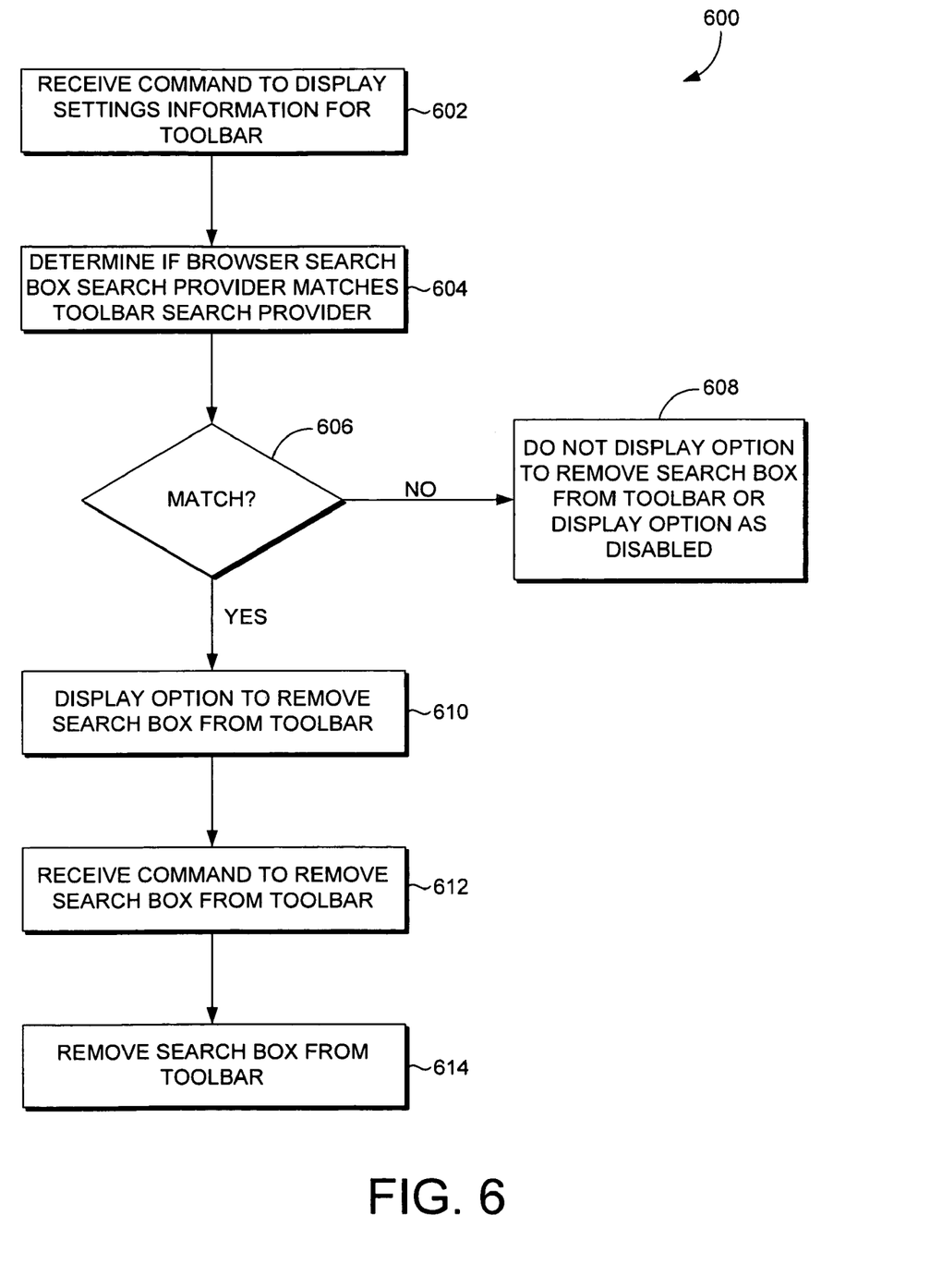
FIG. 6 is a flow diagram showing a method for controlling the option to remove a search box from a toolbar based on the search provider settings of a browser search box in accordance with an embodiment of the present invention.

In some embodiments of the present invention, the option to remove a search box from a toolbar is displayed only when the browser search box search provider is determined to match the toolbar search provider. Otherwise, such an option is not presented to the user. Referring to FIG. 6, a flow diagram is provided to illustrates a method 600 for controlling the display of an option to remove the search box from a toolbar based on the search provider settings of a browser search box in accordance with an embodiment of the present invention.

In accordance with the method 600, a command is received to display settings information for a toolbar, as shown at block 602. For instance, a user may access an options dialog box for the toolbar or a context menu for the toolbar search box. As shown at block 604, it is determined if the browser search box search provider matches the toolbar search provider. If it is determined at block 606 that the browser search box search provider does not match the toolbar search provider, an option to remove the search box from the pool bar is not displayed with the settings information for the toolbar or the option is shown as disabled in some way, as shown at block 608. In this manner, the user is prevented from selecting to remove the search box from the toolbar based on the search provider of the browser search box differing from the search provider of the toolbar. In some embodiments, the user may be provided with an explanation of why the option isn't available, and steps to correct, or an option to set the defaults and hide the search box.

Alternatively, if it is determined at block 606 that the browser search box search provider matches the toolbar search provider, an option to remove the search box from the toolbar is displayed as part of the settings information for the toolbar, as shown at block 610. A command to remove the search box from the toolbar is received, as shown at block 612, for instance, by a user selecting the option to remove the search box from the toolbar presented with the settings information for the toolbar. In response to the command, the search box is removed from the toolbar, as shown at block 614.

Figure 7:
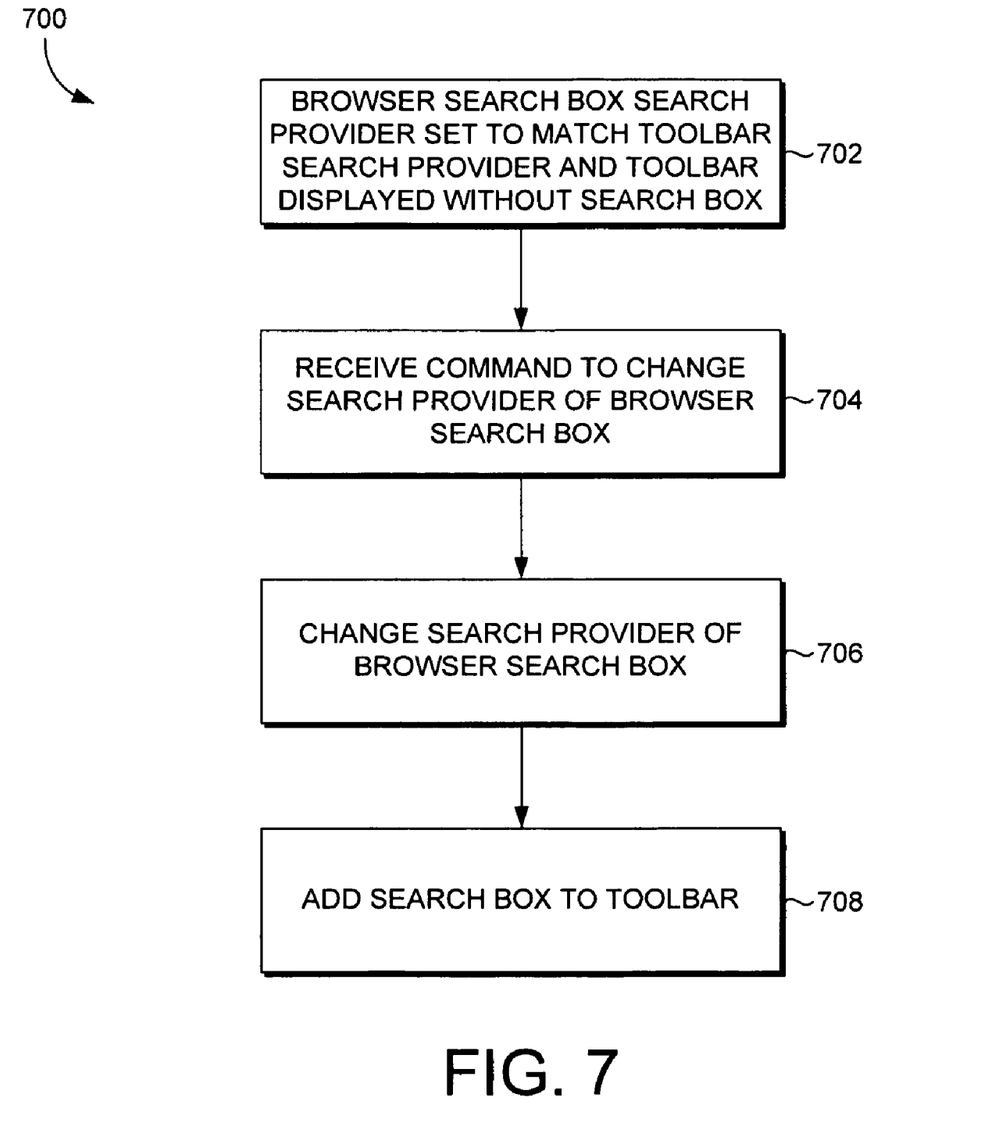
FIG. 7 is a flow diagram showing a method for returning a search box to a toolbar based on the search provider settings of a browser search box in accordance with an embodiment of the present invention.

As discussed previously, in accordance with embodiments of the present invention, a toolbar search box is hidden only as long as the browser search box search provider remains the same as the toolbar search provider. For instance, referring to FIG. 7, a flow diagram is provided that illustrates a method 700 for displaying a search box in a toolbar when the search provider of the browser search box is changed such that it differs from the toolbar search provider in accordance with an embodiment of the present invention. Initially, as shown at block 702, the browser search box search provider is set to match the toolbar search provider and the toolbar is displayed without a search box. A command is then received to change the search provider of the browser search box, as shown at block 704. Based on the command, the search provider of the browser search box is changed at block 706. As such, the search provider of the browser search box no longer matches the toolbar search provider. In response to the change, a search box is added back to the toolbar, as shown at block 708.

Embodiments of the present invention will now be described with reference to FIGS. 8-11B, which include exemplary screen displays of a web browser in which the display of a search box within a toolbar is controlled based on the search provider settings of a browser search box. It will be understood and appreciated by those of ordinary skill in the art that the screen displays of FIGS. 8-11B are provided by way of example only and are not intended to limit the scope of the present invention in any way.

As discussed previously, FIG. 8 illustrates a web browser 800 that includes a browser search box 802. The web browser also includes a toolbar 808, which is associated with Search Provider #1. As shown in the drop-down box 804 associated with the search box 802, Search Provider #3 is currently set as the default search provider of the browser search box 802. Since the search provider of the browser search box 802 differs from the search provider of the toolbar 808, a search box 810 is maintained in the toolbar 808.

Figure 9:
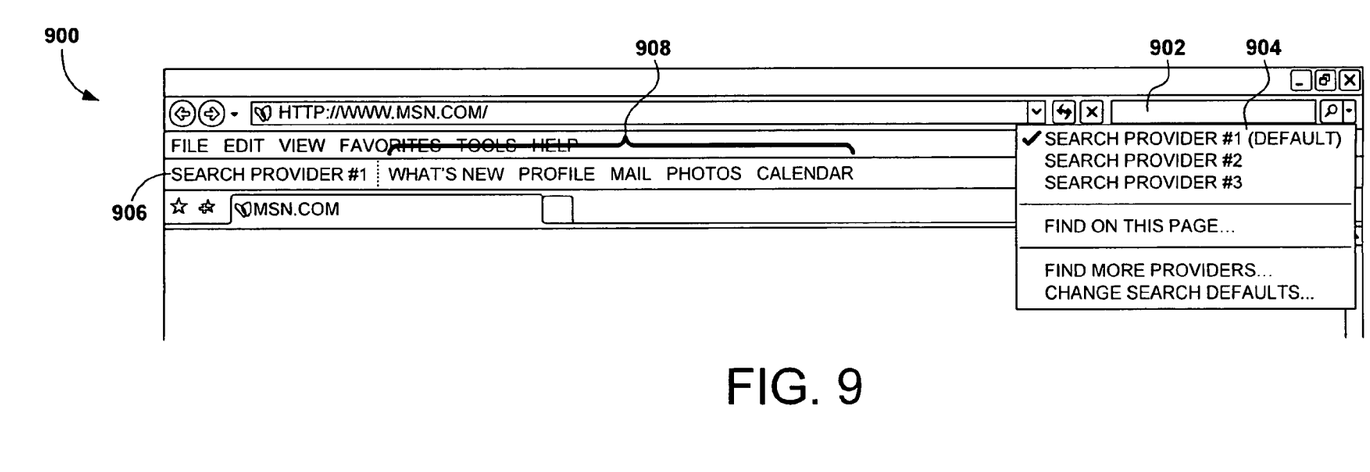
FIG. 9 is an illustrative screen display of a web browser showing a browser search box and a toolbar in which the browser search box search provider matches from the toolbar search provider in accordance with an embodiment of the present invention.

With reference now to FIG. 9, a web browser 900 is illustrated in which Search Provider #1 has been set in the drop-down box 904 as the default search provider of the browser search box 902. Because the search provider of the browser search box 902 is set the same as the search provider of the toolbar 906, the toolbar is displayed without a search box. As indicated above, there are a number of different approaches for allowing the search box to be removed from the toolbar 906. For instance, in some embodiments, the user may access a context menu associated with the toolbar that provides the option to remove the search box. In some embodiments, the user may access an options dialog box for the toolbar or browser that provides the user with the option to hide the toolbar search box. As illustrated in FIG. 9, although the search box has been removed from the toolbar 906, the other elements 908 remain within the toolbar 906, allowing the user to access the additional functionality provided by the toolbar.

Figures 10A, 10B:
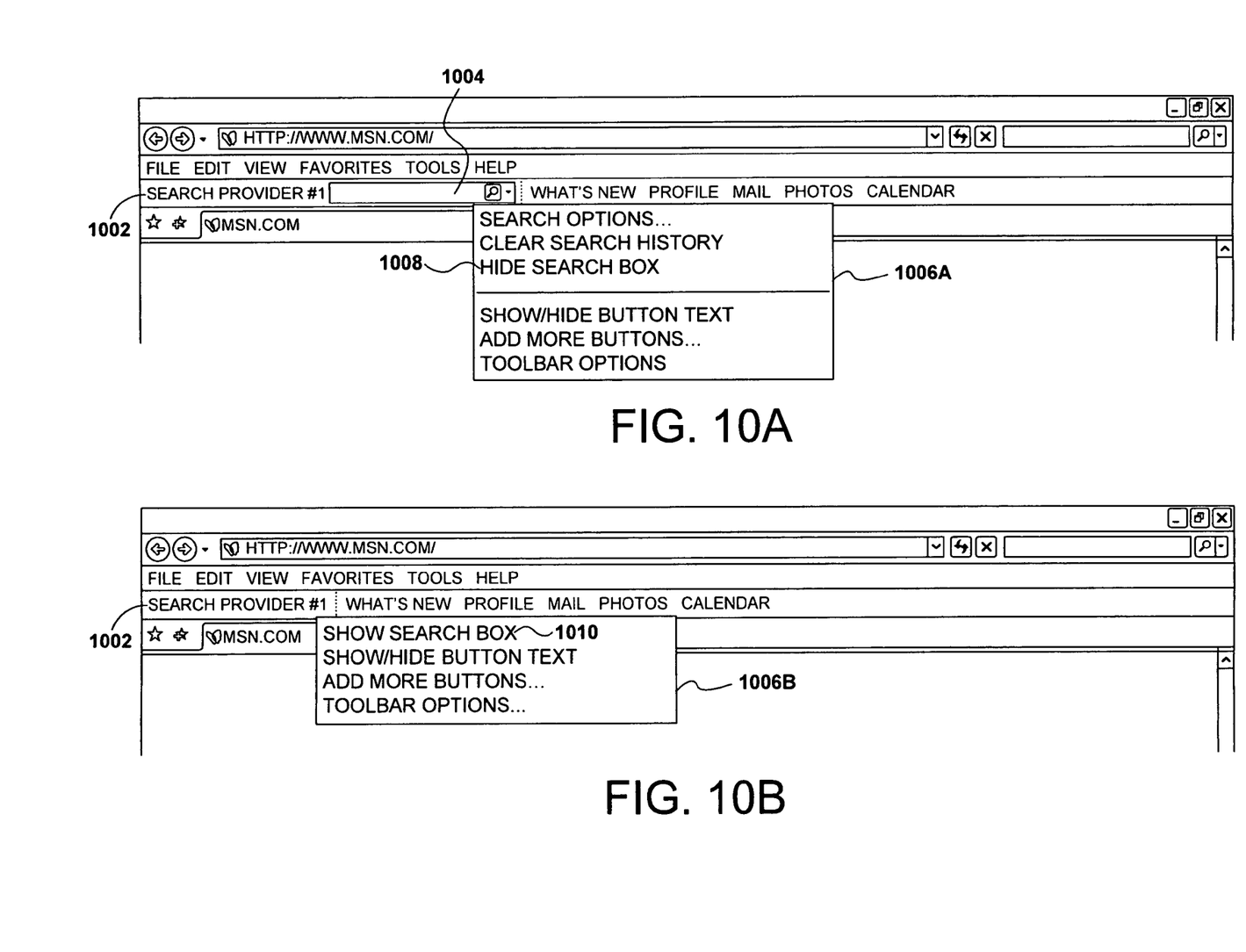
FIG. 10A is an illustrative screen display of a web browser showing a context menu for a toolbar that includes the option to hide the toolbar search box in accordance with an embodiment of the present invention.
FIG. 10B is an illustrative screen display of a web browser showing a toolbar with the search box hidden and a context menu that includes the option to show the toolbar search box in accordance with an embodiment of the present invention.

By way of illustration, FIGS. 10A and 10B illustrate a context menu that provides the option to hide and display a search box in the toolbar. In some embodiments, these options are provided given that the browser search box search provider is set the same as the toolbar search provider. As shown in FIG. 10A, the toolbar 1002 is displayed with a search box 1004. Additionally, a context menu 1006A is displayed adjacent to the toolbar 1002. The context menu 1006A may be displayed, for instance, if the user right clicks in a zone surrounding the toolbar 1002. In the present embodiment, since the search provider of the browser search box matches the toolbar search provider, the context menu 1006A includes the option 1008 to hide the search box 1004. If the user selects the option 1008, the search box 1004 is removed from the toolbar 1002. FIG. 10B illustrates the toolbar 1002 after the search box has been removed. After the search box has been removed, the user may access a context menu 1006B and select the option 1010 to show the search box in the toolbar 1002. If the user selects the option 1010, the search box is displayed within the toolbar 1002.

Figure 11A:
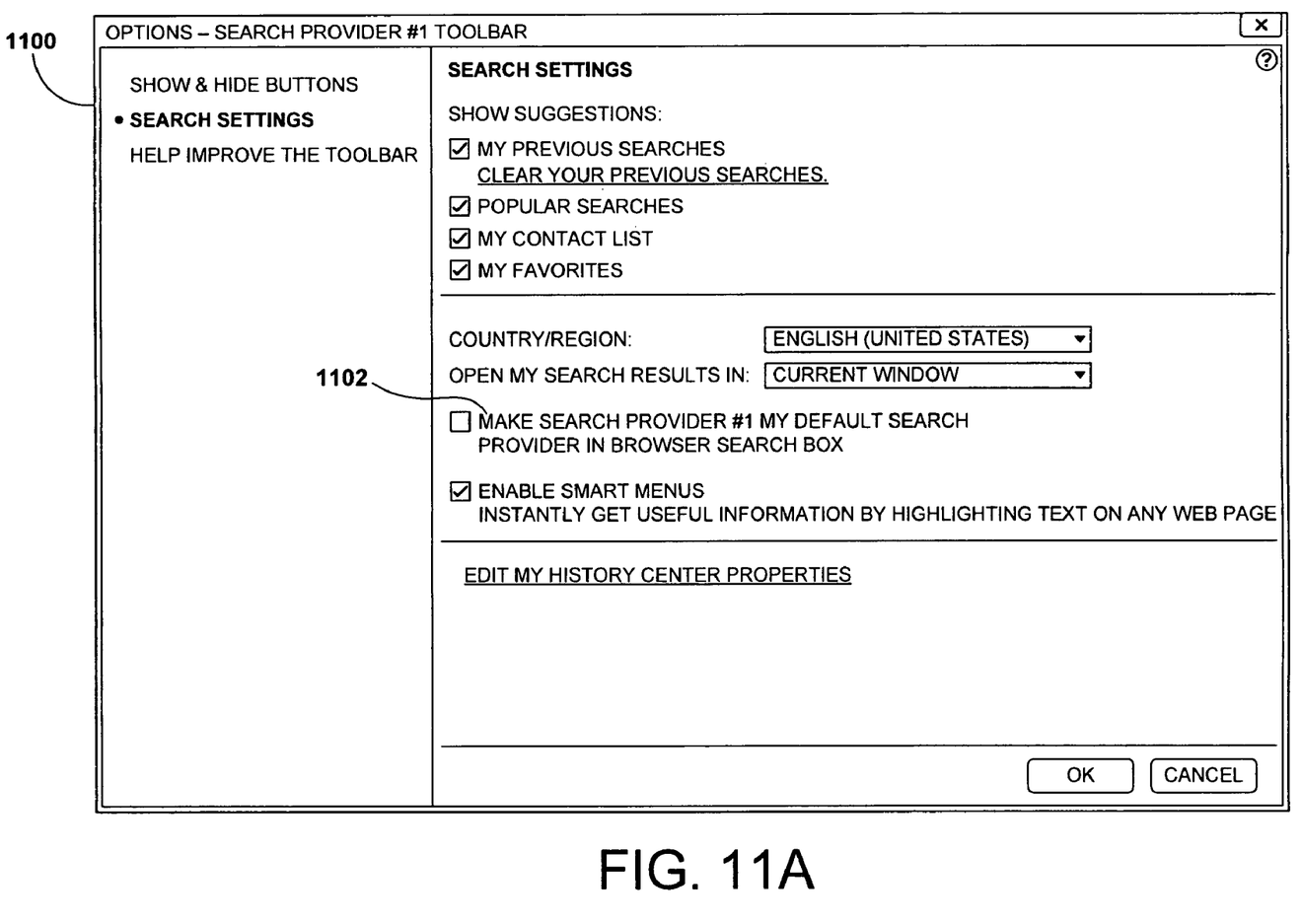
FIG. 11A is an illustrative screen display of a toolbar options dialog that includes the option to set the search provider of the browser search box the same as the toolbar search provider in accordance with an embodiment of the present invention.
Figure 11B:
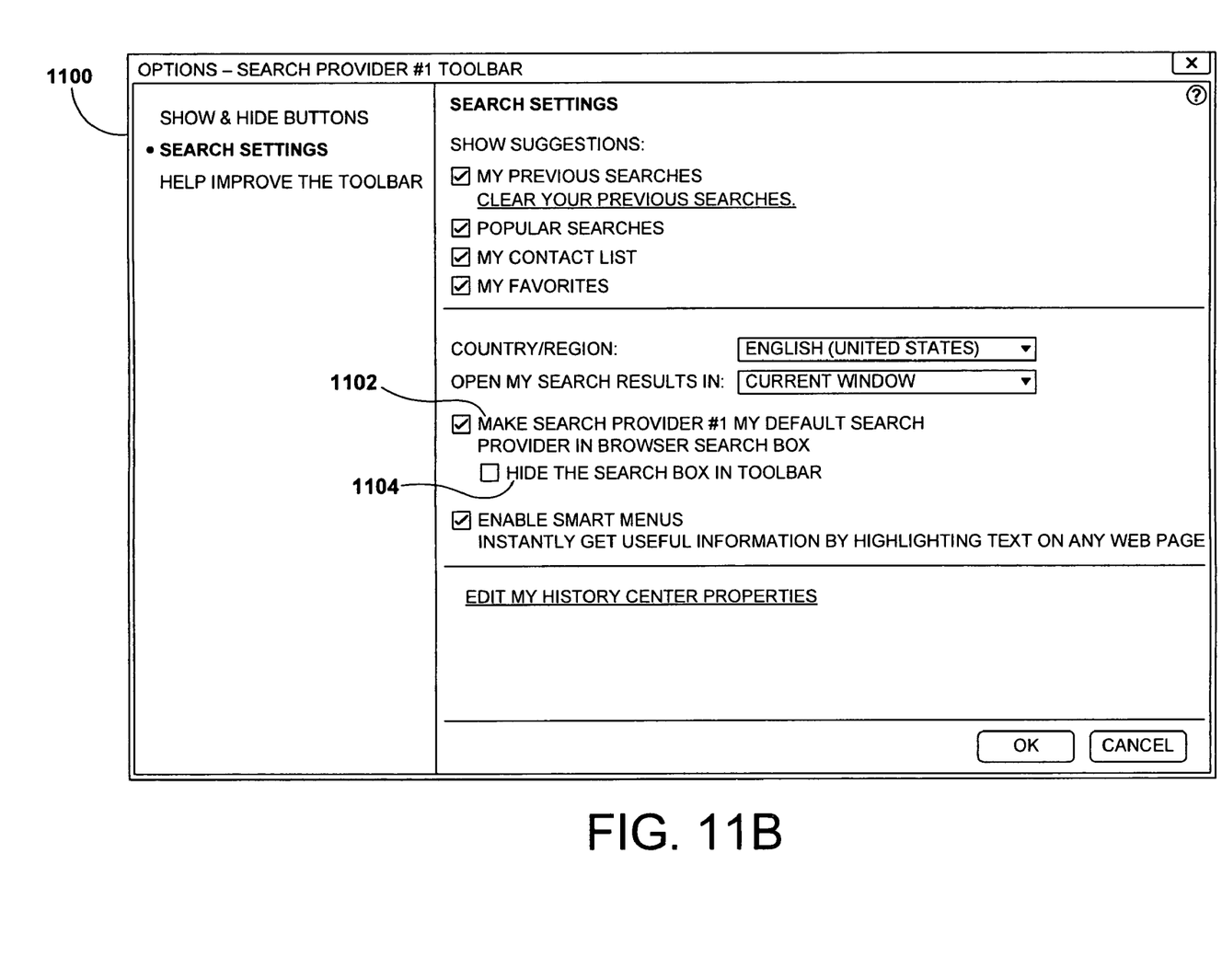
FIG. 11B is an illustrative screen display of a toolbar options dialog that includes the option to hide the search box in the toolbar based on the user setting the search provider of the browser search box the same as the toolbar search provider in accordance with an embodiment of the present invention.

Referring now to FIGS. 11A and 11B, a screen display is provided illustrating an option dialog box 1100 that provides a number of options for the toolbar. As shown in FIG. 11A, the options dialog box 1100 includes the option 1102 to make the search provider of the toolbar (i.e., Search Provider #1) the default search provider for the browser search box. If the user selects the option 1102 in the options dialog box 1100, an option 1104 is presented to hide the search box in the toolbar, as shown in FIG. 11B. If the user selects the option 1104, the search box is removed from the toolbar. In an alternative embodiment, the option 1104 to hide the search box may be displayed within the options dialog box 1100 before the option 1102 is selected but shown as disabled until the option 1102 is selected (e.g., by showing the option 1104 as being grayed out and preventing user selection of the option until the option 1102 is selected).

As can be understood, embodiments of the present invention provide for controlling the display of a search box within a toolbar based on the search provider settings of a native search box.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media, the computer storage media not being a signal per se, storing computer-useable instructions that, when used by a computing device, cause the computing device to perform a method comprising:
displaying a search box within a toolbar when a search provider set for a native search box differs from a search provider for the toolbar; and
allowing the search box to be removed from the toolbar when the search provider set for the native search box matches the search provider for the toolbar.

2. The one or more computer-storage media of claim 1, wherein the native search box comprises a browser search box native to a web browser.

3. The one or more computer-storage media of claim 2, wherein the toolbar comprises a browser extension.

4. The one or more computer-storage media of claim 1, wherein the native search box comprises a desktop search box for searching files and folders stored on the computing device.

5. The one or more computer-storage media of claim 1, wherein the search provider set for the native search box comprises a default search provider for the native search box.

6. The one or more computer-storage media of claim 1, wherein allowing the search box to be removed from the toolbar when the search provider set for the native search box matches the search provider for the toolbar comprises:
determining that the search provider set for the native search box matches the search provider for the toolbar;
presenting a user-selectable option to remove the search box from the toolbar;
receiving a user selection of the option to remove the search box from the toolbar; and
removing the search box from the toolbar.

7. The one or more computer-storage media of claim 6, wherein presenting the user-selectable option to remove the search box from the toolbar comprises:
receiving a command to present settings information for the toolbar; and
presenting the settings information for the toolbar, wherein the option to remove the search box from the toolbar is presented within the settings information based on determining that the search provider set for the native search box matches the search provider for the toolbar.

8. The one or more computer-storage media of claim 1, wherein allowing the search box to be removed from the toolbar when the search provider set for the native search box matches the search provider for the toolbar comprises:
receiving a command to remove the search box from the toolbar;
determining that the search provider set for the native search box matches the search provider for the toolbar; and
removing the search box from the toolbar.

9. The one or more computer-storage media of claim 8, wherein receiving the command to remove the search box from the toolbar is received via a context menu for the toolbar.

10. The one or more computer-storage media of claim 8, wherein determining that the search provider set for the native search box matches the search provider for the toolbar comprises:
initially determining that the search provider set for the native search box differs from the search provider for the toolbar;
displaying an indication that the search box may be removed from the toolbar only if the search provider for the native search box matches the search provider for the toolbar; and
determining that the search provider set for the native search box has been changed to match the search provider for the toolbar.

11. The one or more computer-storage media of claim 1, wherein displaying the search box within the toolbar when the search provider set for the native search box differs from the search provider for the toolbar comprises:
determining that the search provider set for the native search box differs from the search provider for the toolbar; and
preventing the presentation of a user-selectable option to remove the search box from the toolbar.

12. The one or more computer-storage media of claim 1, wherein displaying the search box within the toolbar when the search provider set for the native search box differs from the search provider for the toolbar comprises:
initially displaying the toolbar without the search box when the search provider set for the native search box initially matches the search provider for the toolbar;
determining that the search provider set for the native search box is changed to differ from the search provider for the toolbar; and
displaying the search box in the toolbar based on determining that the search provider set for the browser search box differs from the search provider for the toolbar.

13. One or more computer-storage media, the computer storage media not being a signal per se, storing computer-useable instructions that, when used by a computing device, cause the computing device to perform a method comprising:
receiving a command to remove a search box from a toolbar, the toolbar being provided by a particular search provider as an extension to a web browser application;
determining that a search provider set for a browser search box matches the search provider for the toolbar, wherein the browser search box comprises a search box natively provided by the web browser application, and wherein the browser search box is configured to allow a user to select from a plurality of search providers for performing a search on a search query entered in the browser search box; and
displaying the toolbar without the search box based on determining that the search provider set for the browser search box matches the search provider for the toolbar.

14. The one or more computer-storage media of claim 13, wherein receiving the command to remove the search box from the toolbar is received via a context menu for the toolbar.

15. The one or more computer-storage media of claim 13, wherein receiving the command to remove the search box from the toolbar is received via an options dialog box for the toolbar.

16. The one or more computer-storage media of claim 13, wherein determining that the search provider set for the browser search box matches the search provider for the toolbar comprises determining that the search provider set as a default search provider for the browser search box matches the search provider for the toolbar.

17. The one or more computer-storage media of claim 13, wherein determining that the search provider set for the browser search box matches the search provider for the toolbar comprises:
initially determining that the search provider set for the browser search box differs from the search provider for the toolbar;

displaying an indication that the search box may be removed from the toolbar only if the search provider for the native search box matches the search provider for the toolbar; and determining that the search provider set for the native search box has been changed to match the search provider for the toolbar.

18. The one or more computer-storage media of claim 13, wherein the method further comprises:

determining that the search provider set for the browser search box is changed to differ from the search provider for the toolbar; and displaying the search box in the toolbar based on determining that the search provider set for the browser search box differs from the search provider for the toolbar.

19. One or more computer-storage media, the computer storage media not being a signal per se, storing computer-useable instructions that, when used by a computing device, cause the computing device to perform a method comprising:

displaying a toolbar without a search box when a search provider set for a browser search box matches a search provider for the toolbar;

determining that the search provider set for the browser search box is changed to differ from the search provider for the toolbar; and displaying the search box in the toolbar based on determining that the search provider set for the browser search box differs from the search provider for the toolbar.

20. The one or more computer-storage media of claim 19, wherein determining that the search provider set for the browser search box is changed to differ from the search provider for the toolbar comprises determining that the search provider set as a default search provider for the browser search box is changed to differ from the search provider for the toolbar.

* * * * *